United States Patent
Jones

(10) Patent No.: US 8,272,226 B2
(45) Date of Patent: Sep. 25, 2012

(54) SYSTEM AND METHOD FOR MAKING DOT CLUMPS

(75) Inventor: Stan Jones, Vienna, IL (US)

(73) Assignee: Dippin' Dots, LLC

( * ) Notice: Subject to any disclaimer, the term of this patent is extended or adjusted under 35 U.S.C. 154(b) by 1177 days.

(21) Appl. No.: 12/151,994

(22) Filed: May 6, 2008

(65) Prior Publication Data

US 2009/0277186 A1    Nov. 12, 2009

(51) Int. Cl.
| | |
|---|---|
| F25D 13/06 | (2006.01) |
| F25D 3/08 | (2006.01) |
| F25D 25/00 | (2006.01) |
| F25C 1/00 | (2006.01) |
| F25C 1/22 | (2006.01) |
| A23L 2/00 | (2006.01) |

(52) U.S. Cl. ............ 62/63; 62/1; 62/66; 62/74; 62/340; 62/378; 426/66; 426/67; 426/68; 427/212

(58) Field of Classification Search ................. 62/1, 63, 62/68, 74, 340, 378; 426/66, 68; 427/212
See application file for complete search history.

(56) References Cited

U.S. PATENT DOCUMENTS

| | | | | |
|---|---|---|---|---|
| 5,698,247 | A * | 12/1997 | Hall ................................ | 426/66 |
| 6,555,154 | B2 * | 4/2003 | Jones et al. .................... | 426/524 |
| 7,615,245 | B2 * | 11/2009 | Sweeney et al. .............. | 426/580 |

* cited by examiner

*Primary Examiner* — Marc Norman
*Assistant Examiner* — Filip Zec
(74) *Attorney, Agent, or Firm* — Stockwell & Smedley, PSC

(57) ABSTRACT

A method for producing clumped frozen food products includes the steps of forming a plurality of cryogenically manufactured ice cream units; conveying the units along a conveyor to a rotating container; disposing a liquid on the units while the units are within the rotating container, wherein the liquid hardens into a binder that facilitates fusion of individual units with one another to form a plurality of clumps, each of the clumps respectively comprising a plurality of fused units coupled with the binder. After forming into clumps, the clumps may be removed from the rotating container and stored in a frozen form.

16 Claims, 5 Drawing Sheets

SYSTEM AND METHOD FOR MAKING DOT CLUMPS

FIELD OF THE INVENTION

The present invention relates to an ice cream mechanism, and more particularly to a system and mechanism for creating clumps of particulate ice cream in a binding material.

BACKGROUND OF THE INVENTION

Ice cream products are known to be popular and there is a wide variety of ice cream products on the market that include ice cream by itself and also combined with other ingredients. In particular, there is a market for combining ice cream shapes with various coatings. By adding such coatings to ice cream shapes, the variety of flavors and products can be greatly increased. However, many types of coatings have difficulty being uniformly applied at temperatures where the ice cream is solid or semi-solid. As a result, coated ice cream products may sometimes be unintentionally produced which are unappealing in either taste or appearance, or both. Consequently, an improved system for combining ice cream with coatings is desired. The need for such improvement is especially great with regards to ice-cream type food products formed using cryogenically cooled equipment.

SUMMARY OF THE INVENTION

One aspect of the present invention relates to a method for producing clumped frozen food products that includes the steps of forming a plurality of cryogenically manufactured ice cream units; conveying the units along a conveyor to a rotating container; disposing a liquid on the units while the units are within the rotating container, wherein the liquid hardens into a binder that facilitates fusion of individual units with one another to form a plurality of clumps, each of the clumps respectively comprising a plurality of fused units coupled with the binder. After forming into clumps, the clumps may be removed from the rotating container and stored in a frozen form.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION OF THE PREFERRED EMBODIMENTS

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
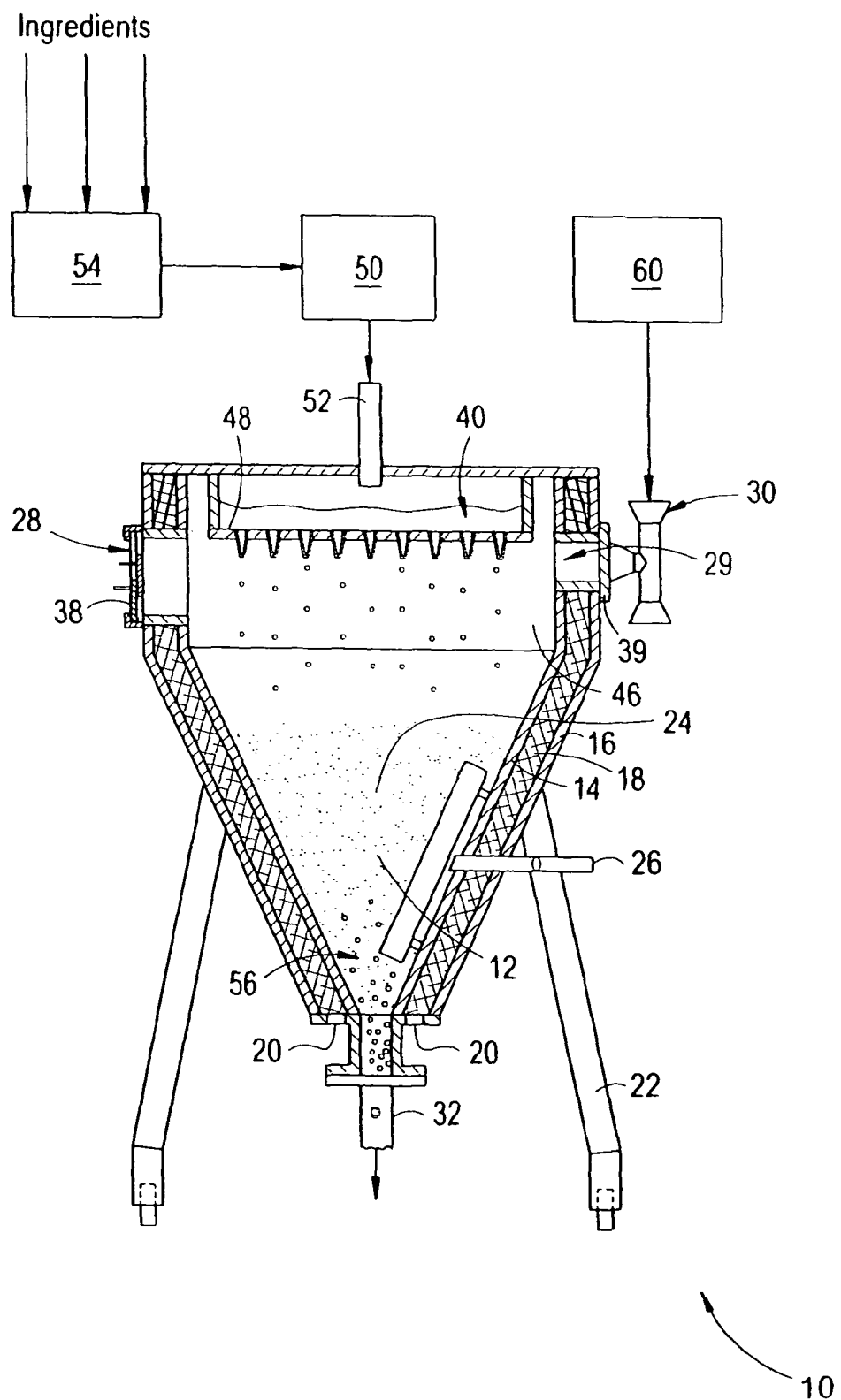
FIG. 1 is a cross-sectional elevational view of a device for forming units of frozen food product in accordance with the principles of the present invention.

FIG. 1 shows a cryogenic processor 10 constructed in accordance with the present invention to produce free-flowing units 56 or beads of frozen food product. The cryogenic processor 10 includes a freezing chamber 12 that is most preferably in the form of a conical tank that holds a liquid refrigerant 24, preferably liquid nitrogen, therein. The freezing chamber 12 incorporates an inner shell 14 and an outer shell 16. Insulation 18 is disposed between the inner shell 14 and outer shell 16 in order to increase the thermal efficiency of the freezing chamber 12. Vents 20 are also provided to ventilate the insulated area formed between the shells 14, 16. The freezing chamber 12 shown in FIG. 1 is a free-standing unit supported by legs 22, although the freezing chamber 12 may be included in an associated frame or other structure.

The liquid refrigerant 24 enters the freezing chamber 12 by means of refrigerant inlet 26 in order to maintain a predetermined level of liquid refrigerant 24 in the freezing chamber 12, as some liquid refrigerant 24 can be lost by evaporation or by other means incidental to production. Gaseous refrigerant that has evaporated from the surface of the liquid refrigerant 24 in freezing chamber 12 primarily vents to the atmosphere through exit port 29.

An ambient air inlet port 28 having adjustment doors 38 and an exit port 29 having adjustment doors 39 are provided to adjust the level of gaseous refrigerant which evaporates from the surface of the liquid refrigerant 24 so that excessive pressure is not built up within the processor 10 and freezing of the liquid composition in feed assembly 40 does not occur. The air inlet 28 and adjustment doors 38 cooperate with a vacuum assembly 30, which may be in the form of a venturi nozzle, so that ambient air flows through the inlet 28 and around feed assembly 40 to ensure that no liquid composition freezes therein. This is accomplished by mounting the vacuum assembly 30 and the air inlet 28 on opposing sides of the gas diffusion chamber 46 such that the incoming ambient air drawn by the vacuum assembly 30 is aligned with the feed assembly 40. In this configuration, ambient air flows around the feed assembly 40 warming it to a sufficient temperature to inhibit the formation of frozen liquid composition in the feed assembly flow channels. An air source 60, typically in the form of an air compressor, is attached to the vacuum assembly 30 to provide appropriate suction to create the ambient air flow required.

A feed tray 48 receives liquid composition from a delivery source 50. A pump (not shown) may be used to pump the liquid composition through a delivery tube 52 into the feed tray 48. A premixing device 54 allows several ingredients, not all of which must be liquid (i.e. powdered flavorings or other additives of a size small enough not to cause clogging in the feed assembly 40) to be mixed in predetermined concentrations for delivery to the feed tray 48.

In order to create generally uniformly sized units 56 of frozen product, substantially uniformly sized droplets 58 of liquid composition are required to be fed through gas diffusion chamber 46 to freezing chamber 12. The feed tray 48 is designed with the feed assembly 40 that forms the droplets 58 of the desired character. The frozen product takes the form of the units 56 that are formed when the droplets 58 of liquid composition contact the refrigerant vapor in the gas diffusion chamber 46, and subsequently the liquid refrigerant 24 in the freezing chamber 12. After the units 56 are formed, they fall to the bottom of freezing chamber 12. Extraction of the frozen units 56 occurs through a product outlet 32 formed at the base of the freezing chamber 12. A transport system connects to the bottom of the freezing chamber 12 at the outlet 32 to transport the units 56 to a system 300, which will be described in greater detail below. After having reached the outlet 32, the units 56 are substantially free-flowing and do not stick together. From this point they can be conveyed to desired locations by, for example, a feed auger or a conveyor belt system. The conveyance mechanism is preferable cryogenically cooled so that the temperature of the units 56 remain cool enough that the units 56 retain their free-flowing characteristic.

Figure 2:
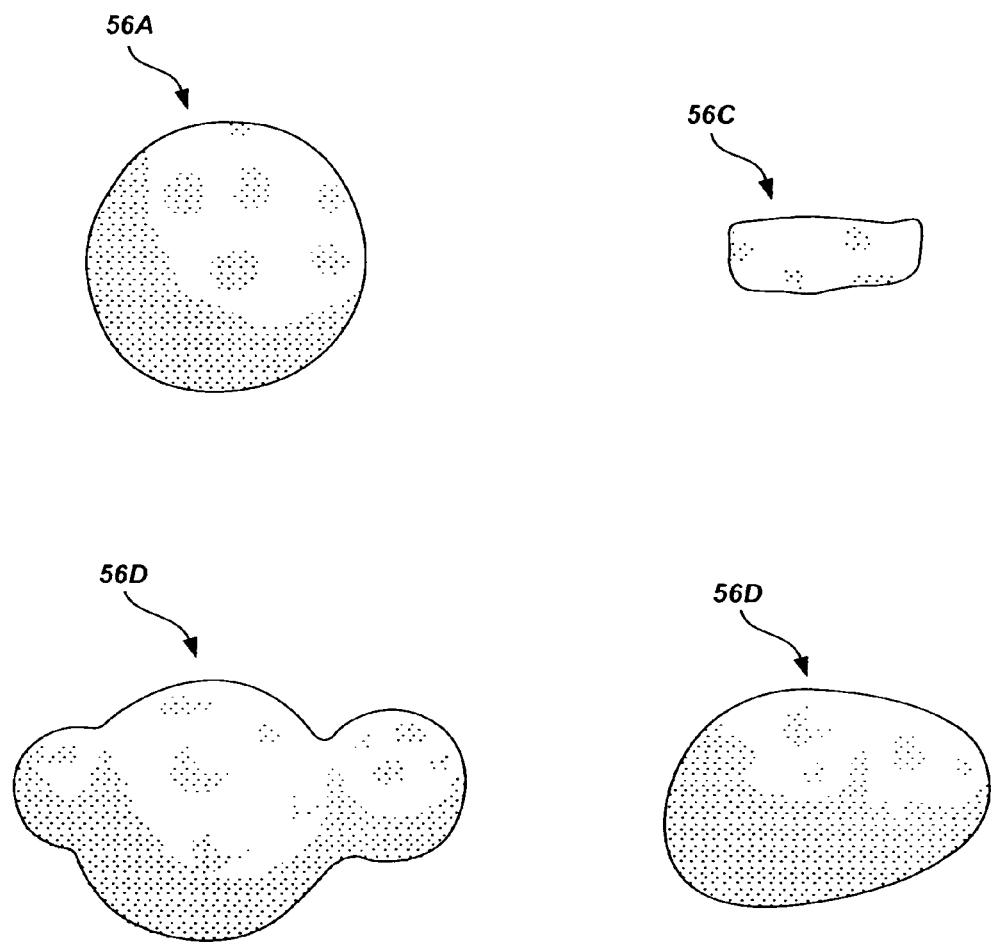
FIG. 2 depicts various generally spherical shapes that are meant to be encompassed by the term "units" as used throughout the present description and claims.

The units 56 produced by the cryogenic processor 10 may be frozen confections, such as ice cream, ice milk, ices, frozen yogurt, sherbet, or sorbet, and ideally remain free-flowing during storage. It is contemplated that the units 56 comprise a generally spherical shape (unit 56A), which is meant to include an oblong or elliptical shape (unit 56B), a tubular shape (unit 56C), or a slightly irregular shape (unit 56D), all of which are depicted in FIG. 2. In addition, the surfaces of the units 56 may be smooth or irregular (i.e. bumpy, pocked, etc.). On average, the units 56 preferably have a diameter of about 5 mm or less, but the diameter may be larger, such as between about 6 and about 10 mm, for example. Units 56 having diameters outside these ranges are also contemplated. For the purposes of this application, for non-spherical shaped units 56 which do not have a conventional diameter, such as the unit 56D illustrated in FIG. 2, the diameter is considered to be the diameter of the smallest sphere into which the unit 56 would fit.

Figure 3:
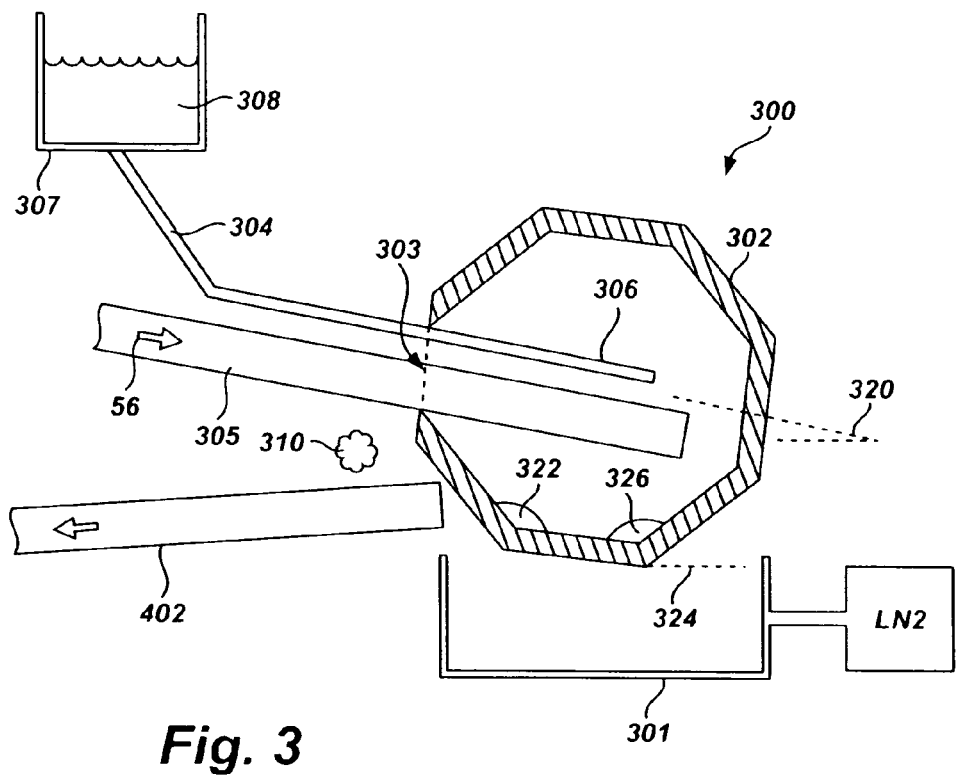
FIG. 3 is a side cross sectional view of a mechanism for applying a liquid or semi-liquid to the various units in accordance with the principles of the present invention.

FIG. 3 shows an exemplary mechanism 300 for manufacturing product clumps in accordance with the principles of the present invention from the various units 56 once they have been produced. The mechanism 300 includes a hopper 302 which may be generally cylindrical in shape with an opening 303 at one end and can be rotated about an axis at its center, such as, for example, by a motor coupled with gears on the outside of the hopper 302. The mechanism 300 also includes an associated cryogenic cooling tray 301 that provides cooling to the hopper 302. It is understood that other methods of cooling the hopper 302 could be used without departing from the spirit and scope of the invention.

An exemplary hopper 302 is depicted in FIG. 3 that has a particular cross-sectional shape for its interior chamber. The interior side walls are angled at various portions to provide the shape as shown. Other hoppers are contemplated within the scope of the present invention that do not necessarily have the specific angled walls shown in FIG. 3. One of ordinary skill will recognize that different sized end-products, different ingredient feed rates, and different rotational speeds of the hopper 302 will all play a role in how the interior of the hopper 302 may be shaped so as to operate in accordance with the principles of the present invention. Thus, the inclusion of specific dimensions and angles in the description below is not intended to limit the present invention to only these specific measurements but is intended to provide one particular set of parameters that have been discovered to provide desirable results.

In the specific hopper 302 of FIG. 3, the angle 322 is about 100 degrees, the angle 324 is about 10 degrees and the angle 326 is about 125 degrees. The central axis of the hopper 302 can be angled 320 relative to a horizontal plane and with a hopper 302 having the cross-sectional shape shown in FIG. 3, an angle 320 of about 45 degrees provides beneficial results. One of ordinary skill will recognize that the values of these angles are approximate and can vary significantly while still maintaining the relative orientations of the various surfaces.

In the embodiment shown, units 56 are fed into the hopper 302 at a continuous rate via a unit supply passageway 305 that enters the hopper 302 through the front opening 303 which can be about 20 inches in diameter, and even larger, in accordance with some embodiments of the present invention. It is understood that the units 56 could be fed into the hopper 302 by other means and at other rates as desired. The supply passageway can include an auger that helps deliver the units 56 at a uniform rate. Furthermore, the passageway 305 is sized so as to allow units as well as previously manufactured non-conforming clumps to pass without constriction. The passageway 305 extends into the hopper 305 and preferably delivers the units 56 to about 1 to 2 inches from the rear of the rotating hopper 302. In one exemplary embodiment, the hopper 302 rotates at about 25 RPMs but depending on the characteristics of the other components of the system, as well as the desired product sizes, this rotational speed can vary from about 10 RPMs to about 50 RPMs.

As the units 56 are fed into the hopper 302, a liquid 308 is also dispensed within the hopper 302. The delivery tube 304 for the liquid 308 has an end 306 from which the liquid exits into the hopper 302. This end 306 is advantageously closer to the opening 303 than is the delivery point of the units 56 at the end of passageway 305. In this way, the liquid 308 is continuously delivered onto newly arriving units 56 as well as smaller clumps that are in the process of forming. One exemplary distance for the end 306 is about 4 to 6 inches from the rear of the hopper 302.

Potential liquid suitable for a frozen food product, includes, but is not limited to, candy, syrup, chocolate, butterscotch, and caramel. In one embodiment in which the liquid 308 is a blend of chocolate, the delivery pipe 304 is about ½ to ¾ inches in diameter and delivers the liquid chocolate via gravity feed. In other instances, the delivery pipe may be smaller or larger and the liquid 308 may even be delivered under pressure via the delivery pipe 304. The fluid passageway 304 is in fluid communication with a reservoir 307 of the liquid 308 that supplies the liquid 308 to the hopper 302. Inside the hopper 302, the liquid 308 comes into contact with the units 56 and begins to harden thereby causing the individual units 56 to form clumps. In order to facilitate clumping and distribution of the liquid 308 and units 56, the mechanism 300 operates to agitate the units 56 and clumps such as, for example, by rotating the hopper 302 so as to tumble the units 56 while applying the liquid 308. One of ordinary skill will recognize that a liquid mixture or two different liquids delivered separately into the hopper 302 may be utilized to expand the possible flavor combinations achievable with embodiments of the present invention. Other inclusions such as nuts or cookie pieces may also be incorporated into the drum.

The fluid passageway 304 is maintained at a temperature sufficient to maintain the liquid 308 in liquid form while in the fluid passageway 304. Moreover, the fluid passageway 304 is maintained at a temperature sufficient to maintain the liquid 308 in liquid form during initial contact with the units 56 to facilitate adhering to the units 56 and for a time shortly thereafter. The particular type of liquid 308 chosen will determine the temperature at which the fluid passageway 304 must be maintained in order to ensure the coating material remains free flowing. However, it has been found that a temperature between about 50° F. and about 75° F. is preferable.

Figure 5:
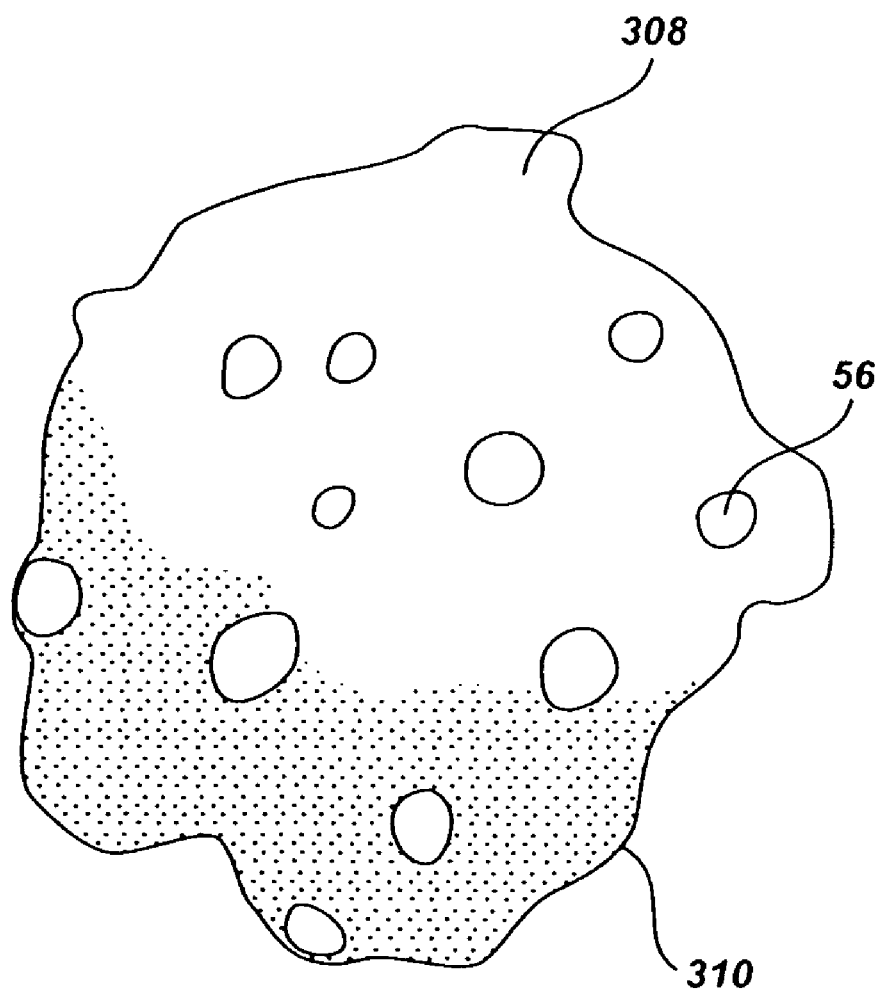
FIG. 5 depicts one of the various shapes that are meant to be encompassed by the term "clumps" as used throughout the present description and claims.

Since the liquid 308 is maintained in liquid form for a period of time after adhering to the units 56, the coating 308 causes multiple units 56 to fuse together, thus forming a plurality of clumps 310. The clumps 310 comprise the fused units 56 and the portion of the liquid 308 facilitating the fusion, as shown in FIG. 5. Within FIG. 5, the liquid 308 is no longer in its liquid form but has hardened so as to fuse the units 56 into a clump 310 wherein the hardened liquid 308 acts as a binder holding the individual units 56 together as a clump 310. As the liquid 308 is applied to the units 56 and the clumps 310 are being formed, the hopper 302 is rotated about an axis as shown in FIG. 3. The rotation of the hopper 302 causes a centrifugal force to be applied to the units 56 and the formed clumps 310. The force exerted on each particle within the hopper 302 is dependent on the size of that particle. The newly-forming clumps tend to migrate towards the front of the hopper 302 as they increase in size. When a sufficient amount of centrifugal force is exerted on a clump, large clumps 310 are caused to move toward the opening 303 of the hopper 302. With this movement toward the opening 303, the large clumps 310 eventually exit the hopper 302, while smaller clumps and the units 56 remain in the hopper 302 where they receive additional coating 308 and clumping. This process is continuously repeated during operation of the system 300 such that clumps 310 are continually produced and conveyed away for further processing.

Figure 4:
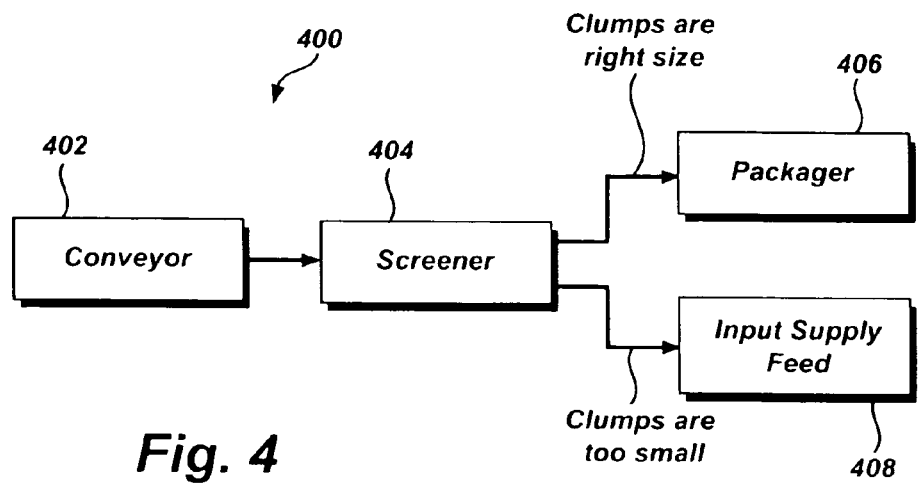
FIG. 4 is a diagrammatic representation of a screening system for removing non-conforming clumps in accordance with the principles of the present invention.

FIG. 4 shows a representation of a screening system 400 comprising a conveyor 402 and a screener 404. It is understood that while only the large clumps 310 are ideally caused to exit the hopper 302, a portion of smaller clumps and/or units 56 (hereinafter collectively referred to as non-conforming clumps) may exit the hopper 302 along with the large clumps 310. In a preferred embodiment, the non-conforming clumps are those that have a diameter of less than about 1 inch, although it is contemplated that other criteria can be used to categorize a clump 310 as a non-conforming clump, such as a weight of the clump 310, for example. Other visual inspection techniques may also be used to automatically screen clumps into the two categories.

Once the large clumps 310 and the non-conforming clumps exit the hopper 302 they are transported by the conveyor 402 to the screener 404. The screener 404 removes and transports the non-conforming clumps back to the system 300 via a non-confirming clump transport 408 which delivers the non conforming clumps to the passageway 305. Alternatively, a separate delivery path into the hopper 302 can be provided for the non-conforming clumps. The conforming clumps are directed towards a packager 406 or similar manufacturing station where they can be packaged or further processed.

Figure 6:
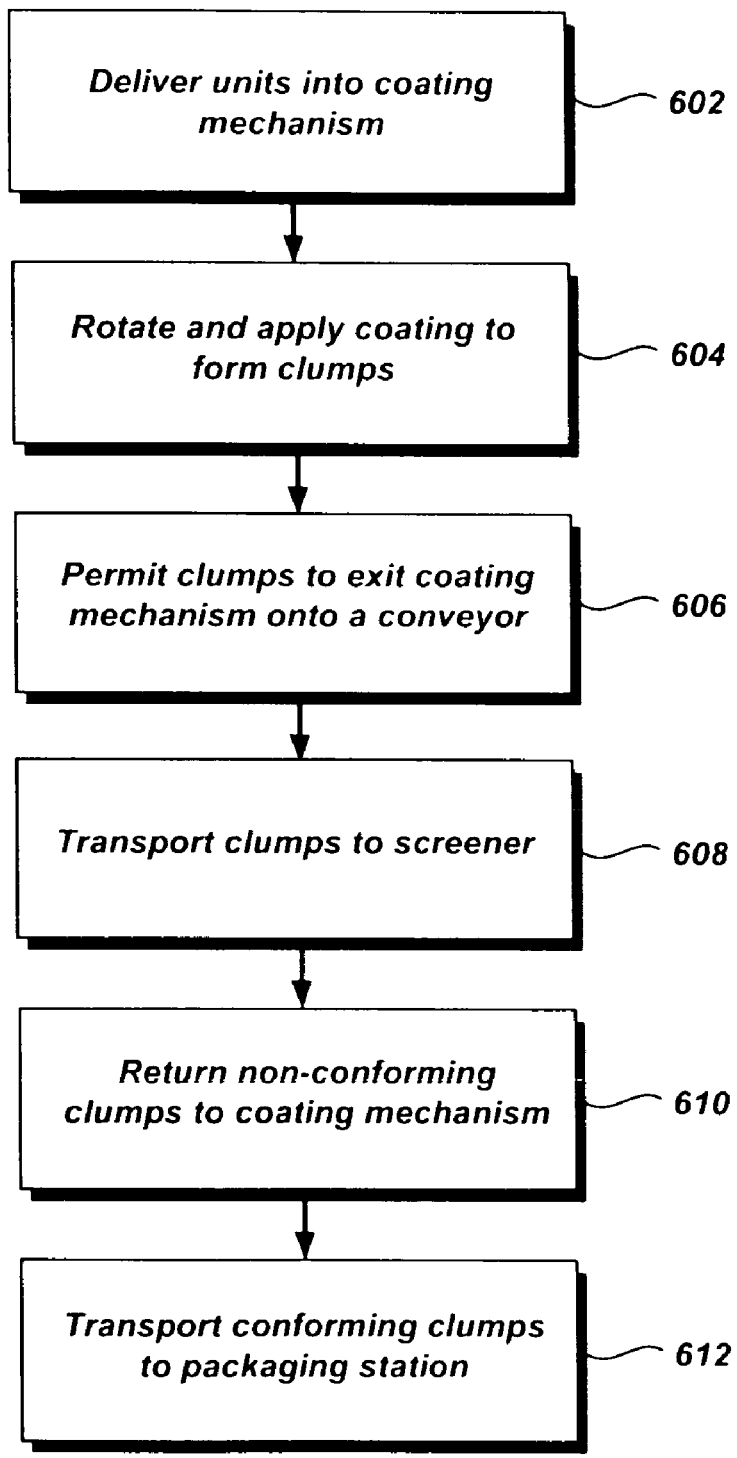
FIG. 6 shows a flowchart of the steps for operating the manufacturing mechanism of FIG. 3 and the screening system of FIG. 4.

FIG. 6 shows a flowchart for operating the system 300 of FIG. 3 and the screener system 400 of FIG. 4. In step 602, the units (and possibly non-conforming clumps) are delivered to the hopper 302 where, in step 604, the hopper 302 is rotated while a liquid 308 is applied to them to form clumps. In step 606, the larger clumps migrate to the opening of the hopper 302 due to centrifugal forces where they are permitted to exit the hopper 302 where they are transported, in step 608, to a screener. From the screener, the non-conforming clumps are returned, in step 610, to the hopper 302 while the conforming clumps are transported to a packaging station, in step 612.

Once at the packager 406, the clumps 310 can be packaged in bulk bags, or placed directly in consumer-friendly packaging that is ready for shipping or ready for retail sales. Until that time, the clumps 310 are stored temporarily in frozen form.

The above processes produce clumps 310 which, due to the ice cream component provided by units 56, can be stored at between about −40° F. and about 5° F., but preferably at temperatures between about between about −20° F. and about −40° F. The amount of the hardened liquid within the clump plays a role in determining the storage temperature as a larger amount, in general, provides more insulating effect than a lesser amount. The relative taste of each flavor along with the mouth-feel of the product all play a role in determining the desired relative proportions of the units portion and the liquid portion of a clump. The formulation of the cryogenically manufactured ice cream units may be modified so as to result in a clump that may be stored in a conventional freezer. Thus, the ice cream formulation, the type of liquid used, the relative proportions of liquid and ice cream, and the size of a clump are all factors that can be modified to manufacture various products having different desirable characteristics.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for producing clumped frozen food products comprising the steps of:
   forming a plurality of cryogenically manufactured ice cream units;
   conveying the units along a conveyor to a rotating container;
   disposing at least one liquid within the rotating container while the units are within the rotating container, wherein the liquid contacts the units and hardens to facilitate fusion of individual units with one another to form a plurality of clumps, each of the clumps respectively comprising a plurality of fused units coupled with a binder of hardened liquid;
   removing the clumps from the rotating container; and
   storing the clumps in a frozen form.

2. The method of claim 1, wherein forming a plurality of cryogenically manufactured ice cream units comprises:

delivering a liquid feed composition from a source to a feed tray;

discharging the liquid feed composition from the feed tray through a plurality of orifices in the form of droplets into a gas diffusion chamber disposed immediately below the plurality of orifices, the plurality of orifices having an associated plurality of feed droppers for producing droplets from the liquid composition;

delivering the droplets into a freezing chamber disposed immediately below the gas diffusion chamber; and providing a cryogenically cooled environment in the gas diffusion chamber and in the freezing chamber, whereby the droplets become substantially pre-cooled during a free fall.

3. The method of claim 1, wherein the rotating container has an opening configured to receive the first conveyor.

4. The method of claim 1, wherein disposing of the at least one liquid is accomplished with a delivery pipe configured to deliver, from an external reservoir, the at least one liquid in liquid form within the inside of the rotating container.

5. The method of claim 4, wherein the delivery pipe is insulated.

6. The method of claim 5, wherein the temperature of the at least one liquid is between about 50° F. and about 100° F. at a point of delivery.

7. The method of claim 1, wherein:

the rotating container has an opening, opposite a rear of the conveyor, through which a first delivery mechanism for the at least one liquid, and a second delivery mechanism for the units, enter the rotating container.

8. The method of claim 7, wherein the first delivery mechanism delivers the at least one liquid at a point within the rotating container closer to the opening than where the second delivery mechanism delivers the units within the rotating container.

9. The method of claim 1, wherein the rotating container is cryogenically cooled while the at least one liquid is disposed.

10. The method of claim 1, wherein removing the clumps from the rotating container comprises:

rotating the container to exert a centrifugal force on the clumps, wherein the centrifugal force exerted on the clumps causes clumps having a larger size relative to smaller ones of the clumps to move toward and out of an opening of the rotating container.

11. The method of claim 10, wherein removing the clumps further comprises:

conveying the clumps along a conveyor, and screening the clumps on the conveyor to remove non-conforming clumps.

12. The method of claim 11, further comprising:

reintroducing the non-conforming clumps back into the rotating container.

13. The method of claim 11, wherein the screening removes clumps that have a diameter less than about 1 inch.

14. The method of claim 9, wherein the rotating container further comprises an associated cryogenic cooling tray located in close proximity to the rotating container for cryogenically cooling the rotating container.

15. The method of claim 1, wherein at least one liquid comprises at least one of candy, chocolate, butterscotch, caramel, and syrup.

16. The method of claim 1, wherein storing the clumps in frozen form comprises storing the clumps in frozen form at a temperature of between about negative 40° F. and about 5° F.

* * * * *